United States Patent
Färber

(10) Patent No.: US 9,982,702 B2
(45) Date of Patent: May 29, 2018

(54) THREADED SLEEVE

(71) Applicant: RAMPA Verbindungstechnik GmbH & Co. KG, Schwarzenbek (DE)

(72) Inventor: Wolfgang Färber, Schwarzenbek (DE)

(73) Assignee: RAMPA Verbindungstechnik GmbH & Co. KG, Schwarzenbek (DE)

(*) Notice: Subject to any disclaimer, the term of this patent is extended or adjusted under 35 U.S.C. 154(b) by 116 days.

(21) Appl. No.: 14/954,067

(22) Filed: Nov. 30, 2015

(65) Prior Publication Data

US 2016/0123370 A1    May 5, 2016

(30) Foreign Application Priority Data

Dec. 1, 2014   (EP) .................................... 14195605

(51) Int. Cl.
*F16B 37/12* (2006.01)
*F16B 25/00* (2006.01)

(52) U.S. Cl.
CPC ........ *F16B 37/127* (2013.01); *F16B 25/0068* (2013.01)

(58) Field of Classification Search
CPC .............. F16B 25/0069; F16B 25/0015; F16B 37/125; F16B 25/0068
USPC ................................................ 411/178, 412
See application file for complete search history.

(56) References Cited

U.S. PATENT DOCUMENTS

| | | | | |
|---|---|---|---|---|
| 2,515,773 A | | 7/1950 | Johnson | |
| 2,742,074 A | | 4/1956 | Rosan | |
| 3,362,281 A | * | 1/1968 | Finlay | F16B 37/122 411/395 |
| 4,097,061 A | * | 6/1978 | Dietlein | A63C 5/06 280/607 |
| 6,113,331 A | * | 9/2000 | Grossberndt | F16B 25/0015 411/387.4 |
| 7,114,902 B2 | * | 10/2006 | Reiter | F16B 13/002 411/387.4 |
| 8,449,235 B2 | * | 5/2013 | Hettich | B21C 37/122 411/178 |
| 9,016,996 B2 | * | 4/2015 | Faerber | F16B 25/0015 411/395 |
| 2008/0152460 A1 | * | 6/2008 | Watanabe | F16B 5/02 411/412 |

FOREIGN PATENT DOCUMENTS

| | | |
|---|---|---|
| DE | 20001429 U1 | 4/2000 |
| EP | 0905388 A1 | 3/1999 |
| EP | 2497962 A2 | 9/2012 |

* cited by examiner

*Primary Examiner* — Flemming Saether

(74) *Attorney, Agent, or Firm* — Kelly & Kelley, LLP

(57) ABSTRACT

The invention relates to a threaded sleeve for screwing into a receiving opening of a workpiece, with a core and a thread mounted outside on the core, wherein the thread has three thread turns, wherein the thread turns have a thread profile, wherein the thread profile has a flank angle of 25° to 35°, wherein with an outer diameter of 8 mm to 14 mm the pitch of the thread is in the range of 0.5 to 1.0 times the outer diameter of the threaded sleeve and with an outer diameter greater than 14 mm to 40 mm, pitch of the thread is in the range of 0.25 to 0.65 times the outer diameter of the threaded sleeve, and wherein the thread depth of the thread profile is in the range of 0.03 times to 0.15 times the outer diameter of the threaded sleeve.

24 Claims, 2 Drawing Sheets

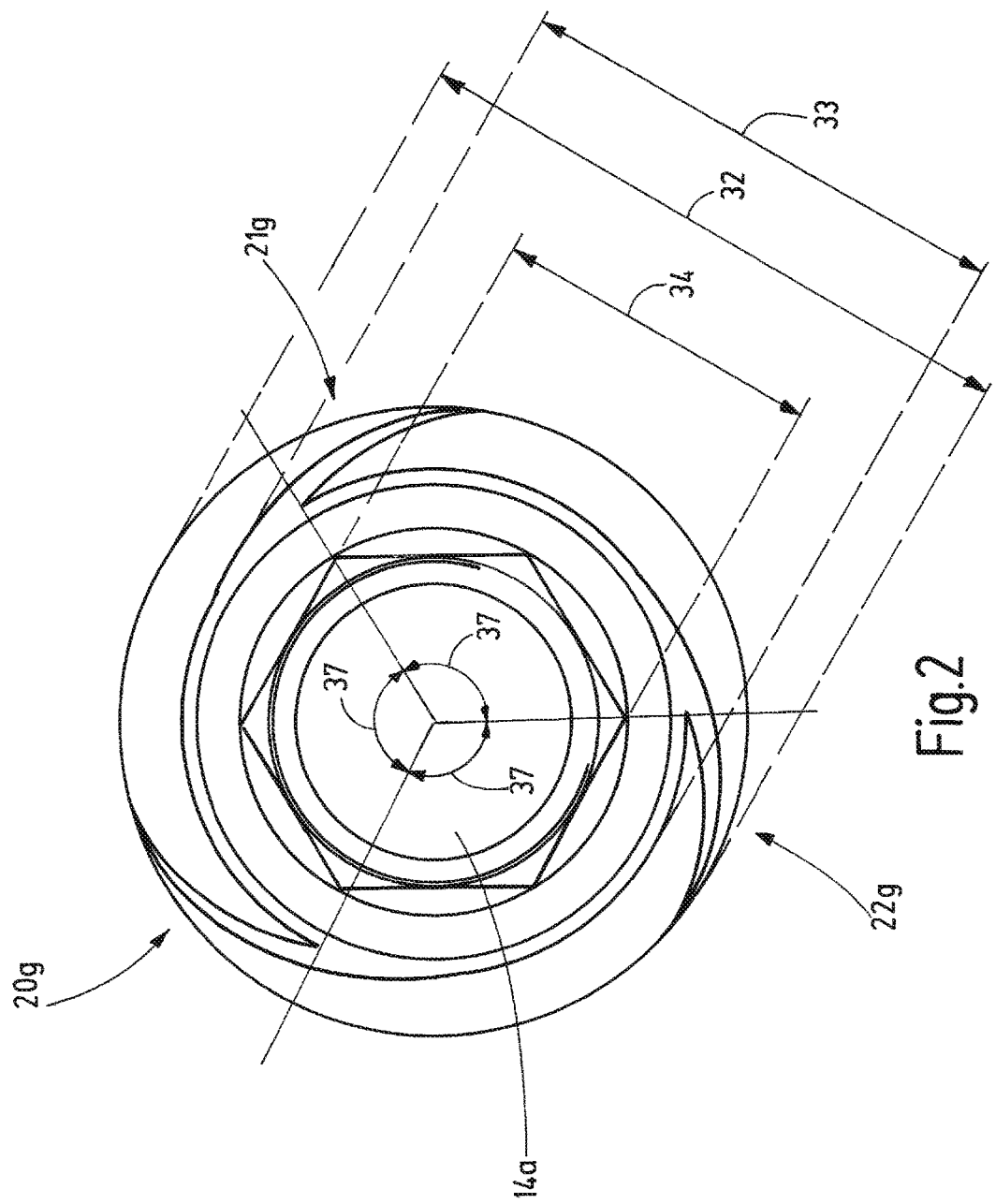

THREADED SLEEVE

FIELD OF INVENTION

The invention relates to a threaded sleeve for screwing into a receiving opening of a workpiece.

BACKGROUND OF THE INVENTION

Threaded sleeves with a core and a thread attached on the outside of the same are known from the prior art. It has proved to be a disadvantage of the known threaded sleeves that when screwing the threaded sleeve into a workpiece said threaded sleeve tilts and the threaded sleeve is assembled askew. For this reason, the necessary predrilled hole is often embodied larger which results in that insufficient tensile strength of the connection between threaded sleeve and workpiece can be established. The reason for this is that upon successful assembly of the threaded sleeve the external thread has not anchored itself deep enough into the surrounding workpiece.

Upon askew assembly of the threaded sleeve in the workpiece, crack formations, heating of the workpiece or its deformation frequently occur. Furthermore, asymmetrical stress distribution and loads in the workpiece can result in the fracture or destruction of the same.

SUMMARY OF THE INVENTION

The object of the present invention is to state a threaded sleeve with which the screwing-in process is facilitated, the assembly takes place securely perpendicularly to the workpiece and after the screwing-in a stable and loadable connection between threaded sleeve and material is ensured.

According to the invention, the threaded sleeve is suitable for screwing into a receiving opening of a workpiece. The threaded sleeve comprises a core and a thread mounted on the outer surface of the core. The thread comprises three thread turns with the same thread profile. The thread profile of the threaded sleeve has a flank angle of 25° to 35°, wherein with an outer diameter of 8 mm to 14 mm the lead of the thread is in the range of 0.5 to 1.0 times the outer diameter of the threaded sleeve and with an outer diameter greater than 14 mm to 40 mm the lead of the thread is in the range of 0.25 to 0.65 times the outer diameter of the threaded sleeve, and wherein the thread depth of the thread is in the range of 0.03 times to 0.15 times the outer diameter of the threaded sleeve.

In particular, the threaded sleeve consists of a core and a thread mounted on the surface of the same. The thread preferably extends over a large part of the length of the threaded sleeve, in particular over substantially the entire length of the threaded sleeve. A region at one end of the threaded sleeve can be formed without a thread for an easy insertion and guidance of the threaded sleeve. This region, in this application, is called guiding tip. The length of this region in longitudinal direction of the threaded sleeve is in particular a maximum of 15%, furthermore preferably a maximum of 10% of the length of the threaded sleeve.

A threaded sleeve is also called socket or threaded bush.

The threaded sleeve is designed for screwing into the receiving opening of a workpiece. The receiving opening of the workpiece, into which the threaded sleeve is to be screwed, can for example be formed as a bore. Here, the receiving opening of the workpiece preferably does not have a thread of its own. In particular, the thread comprises an inner wall which delimits the receiving opening. The inner wall of the workpiece is preferably formed smooth-walled.

When using the threaded sleeve, the guiding tip is initially guided into the receiving opening. Through the even contact of the three starts of the thread with the workpiece the threaded sleeve can no longer tilt laterally. Through the screwing-in, i.e. a rotation about the longitudinal axis of the threaded sleeve, the threaded sleeve is introduced into the receiving opening of a workpiece. The thread of the threaded sleeve forms a thread or mating thread in the (smooth-walled) inner wall of the receiving opening while being screwed into a receiving opening.

In principle, the threaded sleeve can be used for screwing into the receiving opening of a workpiece of any kind.

The particularly effective cutting action of the present threaded sleeve is achieved among other things by the very small flank angle of the thread profile, which is in the range between 25° and 35°. The thread profile is the outline of a thread turn of the thread formed in cross section. The flank angle is the angle that is included by the flanks forming the thread profile.

By selecting a small flank angle, a better cutting action for cutting into the preferably smooth-walled inner wall of the receiving piece delimiting the receiving opening is achieved, which results in a low required torque when screwing in the threaded sleeve. The thread of the threaded sleeve does not displace, compress or compact the material of the workpiece, but cuts the same, while adequate stability of the flank angle has to be ensured so that the tensile loadability continues to be retained. Consequently, the threaded sleeve is assembled perpendicularly and the substantially lower forces on the surrounding material prevent deformation or destruction of the material. The reliable straight processing allows an only unsubstantially larger receiving bore than the core diameter of the threaded sleeve and thus a deeper assembly of the external thread in the surrounding material. Accordingly, a substantially increased tensile strength of the connection is created on the whole. Furthermore, the screwing-in resistance is reduced through the small flank angle so that the threaded sleeve can be assembled more easily and thus with simpler tools.

Furthermore, the thread of the threaded sleeve is of the triple-threaded type. Preferably the thread comprises three thread turns. In particular, the threaded sleeve comprises three starts of the thread in at least one end region of the threaded sleeve. These thread turns are mounted on the core of the threaded sleeve in particular at a radial distance of 120° to one another. In particular, the thread turns run equidistantly to one another over the entire length of the threaded sleeve. Each of the thread turns runs preferentially over the same length of the threaded sleeve, wherein this length preferably amounts to a large part of the length, in particular substantially the entire length of the threaded sleeve. The region of the guiding tip at an end of the threaded sleeve can be formed without a thread for easy insertion of the threaded sleeve.

Through the triple-threaded design of the thread, the threaded sleeve can be screwed into workpieces particularly effectively since through the substantially higher thread lead of the thread turns—compared with single-threaded threads—the threaded sleeve can enter substantially further into the workpiece per revolution. Accordingly, a processing speed of the threaded sleeve that is many times higher can be achieved.

In addition, the threaded sleeve has a very high lead, namely with an outer diameter of 8 mm to 14 mm the lead of the thread is in the range of 0.5 to 1.0 times the outer diameter of the threaded sleeve and with an outer diameter greater than 14 mm to 40 mm the lead of the thread is in the range of 0.25 to 0.65 times the outer diameter of the threaded sleeve. The term lead is to mean the longitudinal axially parallel distance between the centres of two consecutive thread section of the same thread turn. Because of the fact that the thread is of the triple-threaded design, these consecutive thread turn sections are not arranged adjacent to one another as is the case with single-threaded threads, but thread turn sections of the two other thread turns are located in between. The lead must be understood as the distance by which the threaded sleeve is screwed into a material upon one revolution by 360° of the same.

In the dimensioning of the thread lead of threaded sleeves it must be observed in principle that these have to be dimensioned so that the extraction forces that are active do not result in that the threaded sleeve is again extracted out of the workpiece in reverse. However, the size of the thread lead substantially determines the speed with which the same can be assembled in the material.

Furthermore, the thread depth of the thread profile is in the range of 0.3 times to 0.15 times the outer diameter of the threaded sleeve. Thread depth in this case is to mean the half of the difference between outer diameter of the threaded sleeve, which includes the thread, and the outer diameter of the core (without external thread). In other words, the thread depth is the height of the thread profile.

Also with regard to the thread depth, the threaded sleeve finds a compromise between increasing the tensile strength of the connection between threaded sleeve and workpiece through a particularly large thread depth and the damage inflicted on the material, in particular a material of wood, by the entering in the material.

From the interaction of the values defining the threaded sleeve a particularly increased tensile strength of the connection between threaded sleeve and material can be ensured, since workpiece impairment or damage when the threaded sleeve is screwed in is reduced.

Preferably, the threaded sleeve comprises a hollow space. Here, the threaded sleeve comprises in particular an inner wall, which delimits the hollow space of the threaded sleeve, in particular in the radial direction of the threaded sleeve.

In the inner wall of the threaded sleeve, an internal thread can be formed which can extend along the entire hollow space or only along a part. This internal thread serves in particular for receiving a complementary connecting element, for example a screw. Accordingly, the threaded sleeve itself is not a screw.

The hollow space can extend along the entire length of the threaded sleeve or project only from a face end of the threaded sleeve into the same. Preferably, the hollow space extends over at least the major part of the length of the threaded sleeve. Preferably, the hollow space is formed cylindrically.

The hollow space comprises in particular two sub-regions. A first sub-region is preferably formed as receiving region for a tool, in particular an Allen key for screwing in the threaded sleeve. For this purpose, the inner wall of the core preferably comprises notches which are orientated parallel to the longitudinal axis, in which the tool can engage. A second sub-region is preferably formed as receiving region for a further connecting element, in particular a screw. In the second sub-region, the threaded sleeve comprises in particular an internal thread for turning the connecting element.

Preferably, the first sub-region and the second sub-region each have a length in the direction of the longitudinal direction of the threaded sleeve, wherein the sum of the lengths substantially amounts to the length of the threaded sleeve. Accordingly, the sum of the lengths is at least 80%, further preferably at least 90% of the length of the threaded sleeve. In particular, the hollow space exclusively consists of the two sub-regions.

Further preferably, the threaded sleeve tapers on at least one of its axial ends, preferably on both ends. Here, the tapering region has an angle of 45° to a longitudinal direction of the threaded sleeve.

With an outer diameter of 8 mm to 14 mm, the lead of the thread is in the range of 0.53 times to 0.94 times the outer diameter of the threaded sleeve and with an outer diameter of 14 mm to 40 mm the lead of the thread is in the range of 0.37 times to 0.65 times.

Furthermore, the thread depth over the entire bandwidth of the outer diameters, i.e. from 8 mm to 14 mm, is in the range of 0.04375 times to 0.125 times the outer diameter of the threaded sleeve.

Preferably, the flank angle is in the range of to 28° to 32°, particularly preferably 29° to 31° and even more preferably exactly 30°.

In particular, with the particularly preferred value ranges indicated above, an extraordinarily good tensile strength of the connection between threaded sleeve and workpiece is achieved.

Preferably, the ratio of thread depth to lead of the thread is in the range of 0.1 to 0.20, preferably 0.11 to 0.17, over the entire bandwidth of the outer diameters. By selecting such a ratio a particularly good tensile strength can be achieved.

In particular, the thread profile does not have any curvature, in particular in a region of the thread profile facing away from the core. The region of the thread facing away from the core is the region of the thread that is spaced most from the core. In a region which is arranged in the immediate vicinity of the core, the thread profile can have a curvature. Accordingly, the transition of the thread to the core can be formed curved. In particular, the profile of the thread is not formed as a round thread. Preferably, the entire thread profile does not have any curvature so that the flanks are in particular planar in design. Because of this, a particularly good cutting effect of the threaded sleeve is achieved.

Further preferably, the thread profile is substantially formed pointed. In particular, the flanks of the thread substantially form a point in the place of the thread profile that is spaced furthest from the core. Due to the manufacture, a thread profile that is formed perfectly pointed cannot always be ensured. Between the ends of the thread flanks, which face away from the core of the threaded sleeve, a plateau can develop, which runs substantially parallel to the core of the threaded sleeve. However, this plateau should be a maximum of only 10%, preferably a maximum of 5%, further preferably only of 3% of the distance included by the flanks between their ends facing the core, so that a profile that is substantially formed pointed, materialises.

It is furthermore preferred that the flank angle is constant along the entire thread depth. This is the case when the flanks of the thread in the thread profile neither have folds nor roundings, but in each case can be described by a straight line with constant linear pitch.

Particularly preferably, the threaded sleeve is adapted for screwing into a workpiece of wood. The threaded sleeve and the piece of wood in the turned-in state of the threaded sleeve in particular form a common system.

It is particularly advantageous that the threaded sleeve does not compact or compress the wood or the cell structure of the wood, but rather only cuts the same instead. This results in a substantially increased tensile strength between threaded sleeve and the workpiece of wood. This effect is further increased by the wood structure. Wood in principle has a higher tensile strength in longitudinal direction of the annual rings than in transverse direction, since the different annual rings have different material characteristics and often more moderately loadable connections exist between individual annual rings. If by introducing a threaded sleeve the wood or its cell structure is compressed and thus destroyed the cohesion between the individual annual rings is further reduced and the tensile strength between the threaded sleeve and the wooden workpiece decreases.

Preferably, the core of the threaded sleeve has a substantially continuously constant diameter. Here, both the outer diameter and the inner diameter of the core, which at the same time is the diameter of the hollow space of the core (screw receiving opening), can be formed continuously constant.

Particularly preferably, the threaded sleeve is made of metallic materials, but can however be formed in plastic, in particular synthetic fibre material.

BRIEF DESCRIPTION OF THE DRAWINGS

A preferred embodiment of the invention is shown in the figures, which schematically show:

FIG. 2: a top view of a threaded sleeve according to FIG. 1.

DETAILED DESCRIPTION OF THE PREFERRED EMBODIMENT

Figure 1:
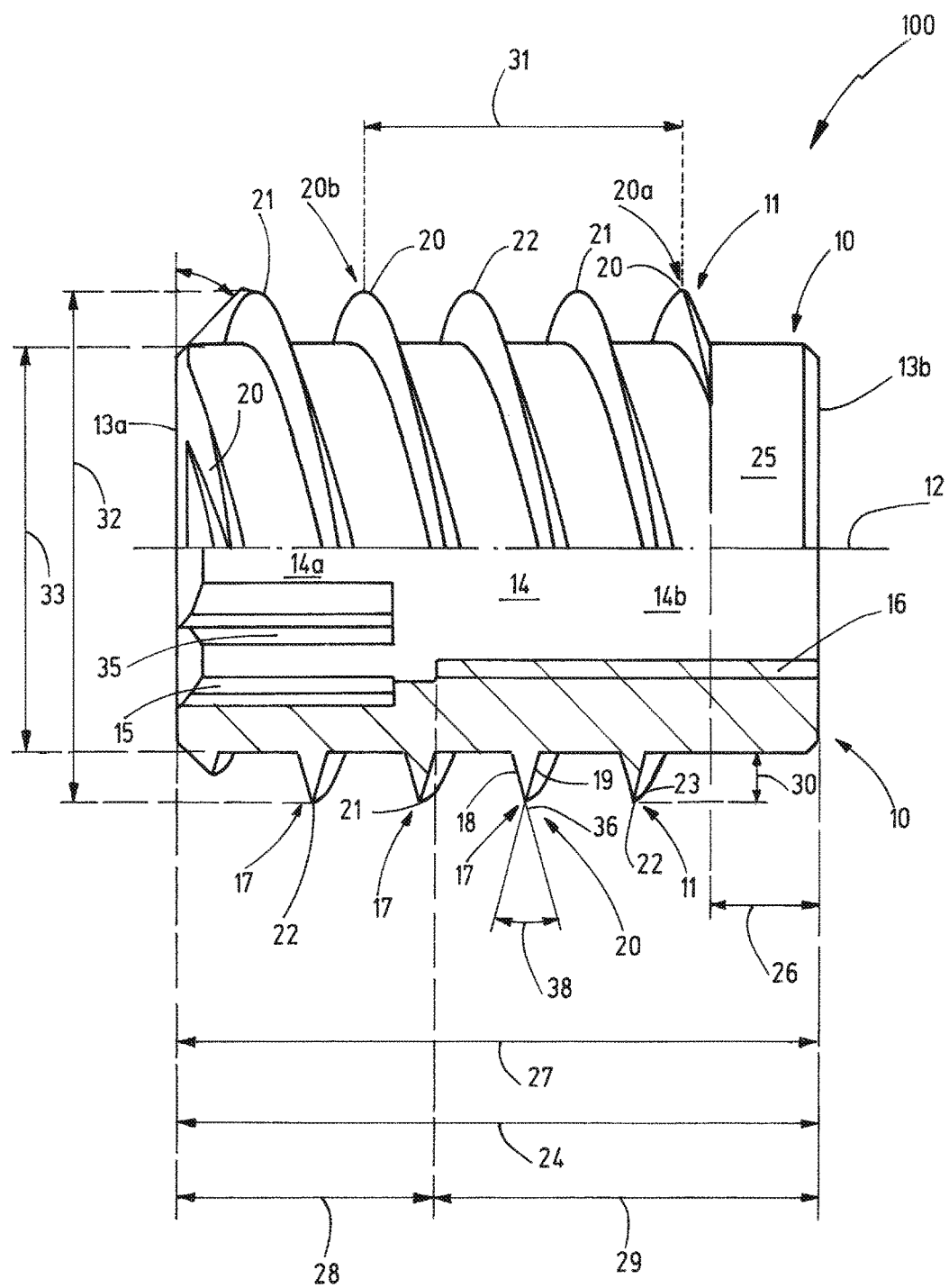
FIG. 1: a lateral view and a longitudinal section of a threaded sleeve according to the invention.

FIG. 1 shows a lateral view and a longitudinal section of a threaded sleeve 100 according to the invention of length 24 comprising a cylindrical core 10 and a thread 11 that is mounted outside on the core 10. The lower half of FIG. 1 shows a section along the longitudinal axis 12 of the threaded sleeve 100, while on the upper half a lateral view of the threaded sleeve 100 is visible.

The thread 11 of the threaded sleeve 100 is of the triple-threaded design and thus comprises three thread turns 20, 21, 22. In the upper figure half it is evident how the three thread turns 20, 21, 22 of the triple-threaded thread 11 helically wind about the core 10 from the one end 13b to the other end 13a of the threaded sleeve 100. Here, a region 25, the so-called guiding tip, is formed without threads along the length 26 at the end 13b of the threaded sleeve 100. This threadless region 25 along the length 26 serves for the perpendicularly guided insertion of the threaded sleeve 100 into a receiving opening (not shown here), into which the threaded sleeve 100 is turned. It is additionally evident that the threaded sleeve 100 at both of its ends 13a, 13b tapers conically.

In the lower figure half it is visible that the depicted threaded sleeve 100 has a cylindrical hollow space 14, which extends from the one axial end 13a of the threaded sleeve 100 to the other axial end 13b of the threaded sleeve 100. Accordingly, the length 27 of the hollow space 14 corresponds to the length 24 of the threaded sleeve 100.

The hollow space 14 comprises two sub-regions 14a, 14b, namely a first sub-region 14a and a second sub-region 14b, which directly follow one another in longitudinal direction 12 of the threaded sleeve 100. The first sub-region 14a extends along the length 28 starting out from the end 13a of the threaded sleeve 100, while the second sub-region 14b has the length 29. Since the first sub-region 14a and the second sub-region 14b directly follow one another, the sum of the lengths 28 and 29 corresponds to the length 24 of the threaded sleeve 100.

In the first sub-region 14a, the hollow space 14 is formed as receiving region for a tool (not shown here) for screwing in the threaded sleeve 100. The core 10 of the threaded sleeve 100 has an inner wall 35. In the inner wall 35 of the core 10, notches 15 which are orientated parallel to the longitudinal axis are formed, in which the tool can engage. The first sub-region 14a of the hollow space 14 formed for a tool in this instance is formed for receiving an Allen key (not shown here).

In the second sub-region 14b, the hollow space 14 is formed as receiving region for a further connecting element (not shown here), in this case a screw. To this end, the threaded sleeve 100 from FIG. 1 comprises an internal thread 16 for screwing in the connecting element.

In the first sub-region 14a of the hollow space 14, the internal thread 16 was omitted by producing the receiving region with the notches 15. In the sub-region 14b along the length 29, the internal thread 16 is present undiminished. Unlike the thread 11 mounted on the outside, the undiminished internal thread 16 in FIG. 1 is not identified by a thread profile 17 but by the demarcation of a rectangle with the length 29 as long side and the thread depth of the internal thread 16 as short side.

In the longitudinal section in FIG. 1, the respective thread profile 17 of the three thread turns 21, 22, 23 which are each designed in the same way is visible with their characteristic variables. The thread depth 30 is half the difference of the outer diameter 32 of the threaded sleeve 100 and the outer diameter 33 of the core 10. The thread lead 31 indicates the longitudinal axially parallel distance between the centres of consecutive thread turn sections 20a, 20b of the same thread turn 20.

The two drawn-in flanks 18 and 19 of the thread profile 17 in this exemplary embodiment form an isosceles triangle, wherein the flank angle is 30°. The region 23 of the thread profile 17 that is spaced furthest from the core 10 is formed as point 36 through the continuously linear form of the flanks 18 and 19.

FIG. 2 shows a top view of the end 13a of the threaded sleeve 100 according to the invention from FIG. 1.

Evident is the first sub-region 14a of the hollow space from FIG. 1 formed as a hexagonal receiving region, which is suitable for receiving a special Allen key (not shown here). While the threaded sleeve 100 has an outer diameter 32, the core 10 of the threaded sleeve 100 has a smaller outer diameter 33. The internal thread 16 of the threaded sleeve 100 has the outer diameter 34.

FIG. 2 likewise shows the thread turns 20, 21, 22 of the thread 11. The three thread turns 20, 21, 22 extend helically from the end 13b of the threaded sleeve 100 to the opposite end 13a, except for the threadless region 25 along the length 26 starting out from the end 13b. Consequently, mainly the starts of the thread 20g, 21g, 22g of the three thread turns 20, 21, 22 are evident in FIG. 2. The radial distance 37 of the thread turns 20, 21, 22 is 120°. The thread turns 20, 21, 22 are thus arranged equidistantly with respect to one another.

In a preferred embodiment, the threaded sleeves according to the invention comprise an outer diameter 32 from 8 mm to 40 mm with a lead 31 between 6 mm and 15 mm and a thread depth between 1 mm and 1.75 mm.

Particularly preferred are the following combinations of the features of the thread 11 or the thread profile 17:

with an outer diameter 32 of the threaded sleeve 100 of 8 mm:
lead 31=6 mm to 7.5 mm
thread depth 30=1 mm
with an outer diameter 32 of the threaded sleeve 100 of 10 mm:
lead 31=6 mm to 7.5 mm
thread depth 30=1.25 mm
with an outer diameter 32 of the threaded sleeve 100 of 12 mm to 14 mm:
lead: 7.5 mm
thread depth: 1.25 mm
with an outer diameter 32 of the threaded sleeve 100 of 16 mm:
lead: 9 mm
thread depth: 1.5 mm
with an outer diameter 32 of 18.5 mm to 22 mm:
lead 31=12 mm
thread depth 30=1.5 mm
with an outer diameter 32 of the threaded sleeve 100 of 25 mm to 40 mm:
lead 31=15 mm
thread depth 30=1.75 mm

The invention claimed is:

1. A threaded sleeve for screwing into a receiving opening of a workpiece, with a core and a thread mounted outside on the core,
   wherein the thread comprises three thread turns,
   wherein the thread turns have a thread profile,
   wherein the thread profile has a flank angle in the range of 25° to 35°,
   wherein the threaded sleeve has an outer diameter in the range of 8 mm to 14 mm,
   wherein the lead of the thread is in the range of 0.5 to 1.0 times the outer diameter of the threaded sleeve, and
   wherein the thread depth of the thread profile is in the range of 0.03 times to 0.15 times the outer diameter of the threaded sleeve.

2. The threaded sleeve according to claim 1, wherein the lead of the thread is in the range of 0.53 times to 0.94 times the outer diameter of the threaded sleeve.

3. The threaded sleeve according to claim 1, wherein the thread depth is in the range of 0.04375 times to 0.125 times the outer diameter of the threaded sleeve.

4. The threaded sleeve according to claim 1, wherein the flank angle is in the range of 28° to 32°.

5. The threaded sleeve according to claim 1, wherein in the ratio of thread depth to lead of the thread is in the range of 0.1 to 0.20.

6. The threaded sleeve according to claim 1, wherein a cross-sectional view of the thread the flanks of the thread profile are planar.

7. The threaded sleeve according to claim 1, wherein the thread profile is substantially formed pointed.

8. The threaded sleeve according claim 1, wherein the flank angle is constant along the entire thread depth.

9. The threaded sleeve according to claim 1, wherein the threaded sleeve is adapted for screwing into a workpiece of wood.

10. The threaded sleeve according to claim 1, wherein the core of the threaded sleeve has a constant diameter.

11. The threaded sleeve according to claim 1, wherein the flank angle is in the range of 29° to 31°.

12. The threaded sleeve according to claim 1, wherein the ratio of thread depth to lead of the thread is in the range of 0.11 to 0.17.

13. A threaded sleeve for screwing into a receiving opening of a workpiece, with a core and a thread mounted outside on the core,
    wherein the thread comprises three thread turns,
    wherein the thread turns have a thread profile,
    wherein the thread profile has a flank angle in the range of 25° to 35°,
    wherein the threaded sleeve has an outer diameter in the range of 14 mm to 40 mm,
    wherein the lead of the thread is in the range of 0.25 to 0.65 times the outer diameter of the threaded sleeve, and
    wherein the thread depth of the thread profile is in the range of 0.03 times to 0.15 times the outer diameter of the threaded sleeve.

14. The threaded sleeve according to claim 13, wherein the lead of the thread is in the range of 0.37 times to 0.65 times the outer diameter of the threaded sleeve.

15. The threaded sleeve according to claim 13, wherein the thread depth is in the range of 0.04375 times to 0.125 times the outer diameter of the threaded sleeve.

16. The threaded sleeve according to claim 13, wherein the flank angle is in the range of 28° to 32°.

17. The threaded sleeve according to claim 13, wherein the ratio of thread depth to lead of the thread is in the range of 0.1 to 0.20.

18. The threaded sleeve according to claim 13, wherein in a cross-sectional view of the thread the flanks of the thread profile are planar.

19. The threaded sleeve according to claim 13, wherein the thread profile is substantially formed pointed.

20. The threaded sleeve according to claim 13, wherein the flank angle is constant along the entire thread depth.

21. The threaded sleeve according to claim 13, wherein the threaded sleeve is adapted for screwing into a workpiece of wood.

22. The threaded sleeve according to claim 13, wherein the core of the threaded sleeve has a constant diameter.

23. The threaded sleeve according to claim 13, wherein the flank angle is in the range of 29° to 31°.

24. The threaded sleeve according to claim 13, wherein the ratio of thread depth to lead of the thread is in the range of 0.11 to 0.17.

* * * * *